(12) United States Patent
Hahn

(10) Patent No.: US 11,634,090 B2
(45) Date of Patent: Apr. 25, 2023

(54) COVER DEVICE FOR A SIDE SILL OF A PASSENGER VEHICLE

(71) Applicant: Daimler AG, Stuttgart (DE)

(72) Inventor: Samuel Hahn, Boeblingen (DE)

(73) Assignee: Daimler AG, Stuttgart (DE)

( * ) Notice: Subject to any disclaimer, the term of this patent is extended or adjusted under 35 U.S.C. 154(b) by 160 days.

(21) Appl. No.: 17/299,396

(22) PCT Filed: Nov. 14, 2019

(86) PCT No.: PCT/EP2019/081391
§ 371 (c)(1),
(2) Date: Jun. 3, 2021

(87) PCT Pub. No.: WO2020/114749
PCT Pub. Date: Jun. 11, 2020

(65) Prior Publication Data
US 2022/0048445 A1     Feb. 17, 2022

(30) Foreign Application Priority Data

Dec. 4, 2018   (DE) ...................... 10 2018 009 450.3

(51) Int. Cl.
*B60R 13/04*   (2006.01)
*B62D 25/02*   (2006.01)

(52) U.S. Cl.
CPC ............ *B60R 13/04* (2013.01); *B62D 25/025* (2013.01)

(58) Field of Classification Search
CPC ............................... B60R 13/04; B62D 25/025

USPC .............................................. 296/209, 136.01
See application file for complete search history.

(56) References Cited

U.S. PATENT DOCUMENTS

| 8,939,456 | B2* | 1/2015 | Shelswell | B60R 3/002 280/166 |
| 11,001,208 | B2* | 5/2021 | Hahn | B60R 13/04 |
| 11,312,318 | B2* | 4/2022 | Hahn | B62D 25/2072 |
| 11,325,543 | B2* | 5/2022 | Hahn | B60R 13/04 |

FOREIGN PATENT DOCUMENTS

| DE | 10 2004 045 382 A1 | 3/2006 |
| DE | 10 2009 031 534 A1 | 2/2010 |
| DE | 10 2012 018 284 A1 | 3/2013 |
| DE | 102017001303 A1 * | 12/2017 |
| DE | 10 2017 000 801 A1 | 3/2018 |

(Continued)

OTHER PUBLICATIONS

PCT/EP2019/081391, International Search Report dated Jan. 28, 2020 (Two (2) pages).

*Primary Examiner* — Dennis H Pedder
(74) *Attorney, Agent, or Firm* — Crowell & Moring LLP

(57) ABSTRACT

A cover device for a side sill of a passenger vehicle includes a sill cover which has a cover element securable on the side sill and a mobile cover element which is disposable in a length region of the side sill below a door opening of the passenger vehicle. The mobile cover element is displaceable between a covering position and an entry position by a drive unit and the drive unit, configured as a pre-assembled structural unit, has a motor and is disposed in a region of the cover element by a holding device. The motor is disposed on an outside of the cover element and protrudes into an interior of the sill cover with a motor shaft.

9 Claims, 8 Drawing Sheets

(56) References Cited

FOREIGN PATENT DOCUMENTS

| | | |
|---|---|---|
| DE | 10 2017 000 799 A1 | 4/2018 |
| DE | 10 2017 000 394 A1 | 7/2018 |
| DE | 10 2017 000 405 A1 | 7/2018 |
| DE | 10 2017 000 803 A1 | 8/2018 |
| FR | 2 729 114 A1 | 7/1996 |
| FR | 2729114 A1 * | 7/1996 ................ B60J 5/04 |
| KR | 10-1525745 B1 | 6/2015 |
| WO | WO 2006/029767 A1 | 3/2006 |
| WO | WO 2018/134160 A1 | 7/2018 |

* cited by examiner

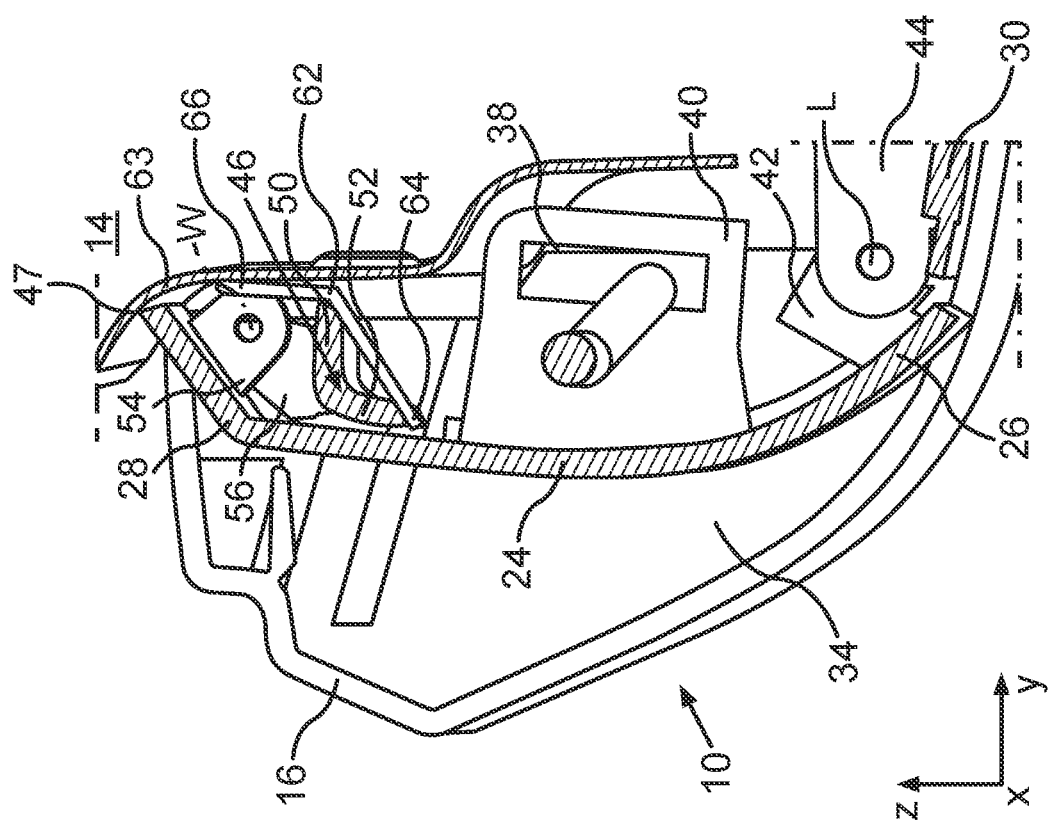
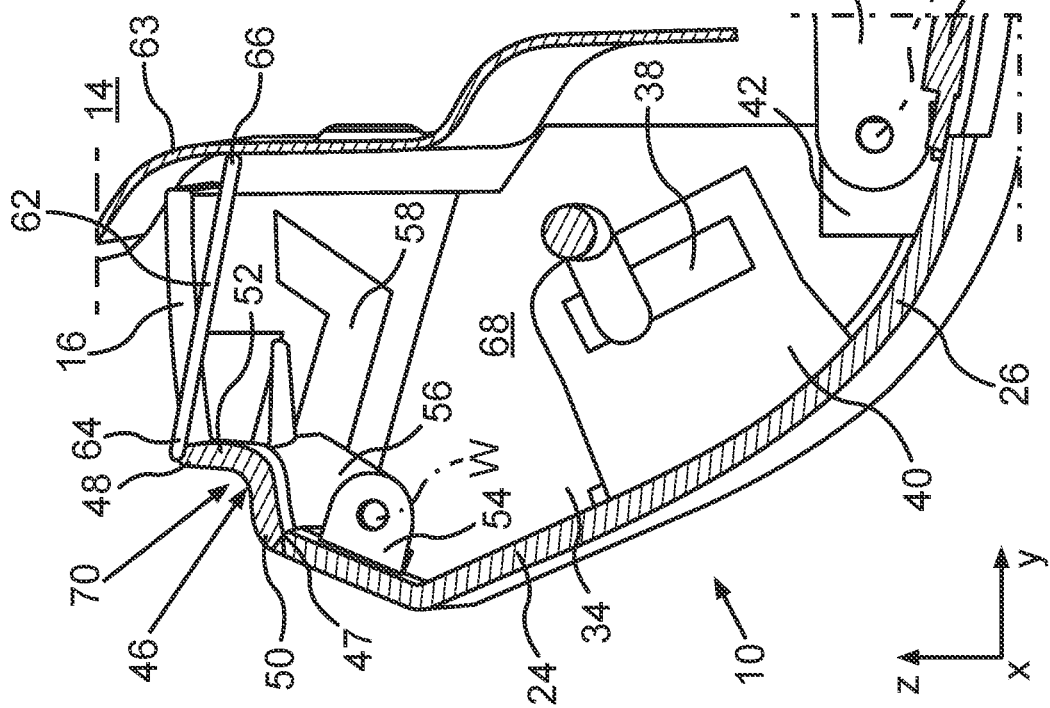

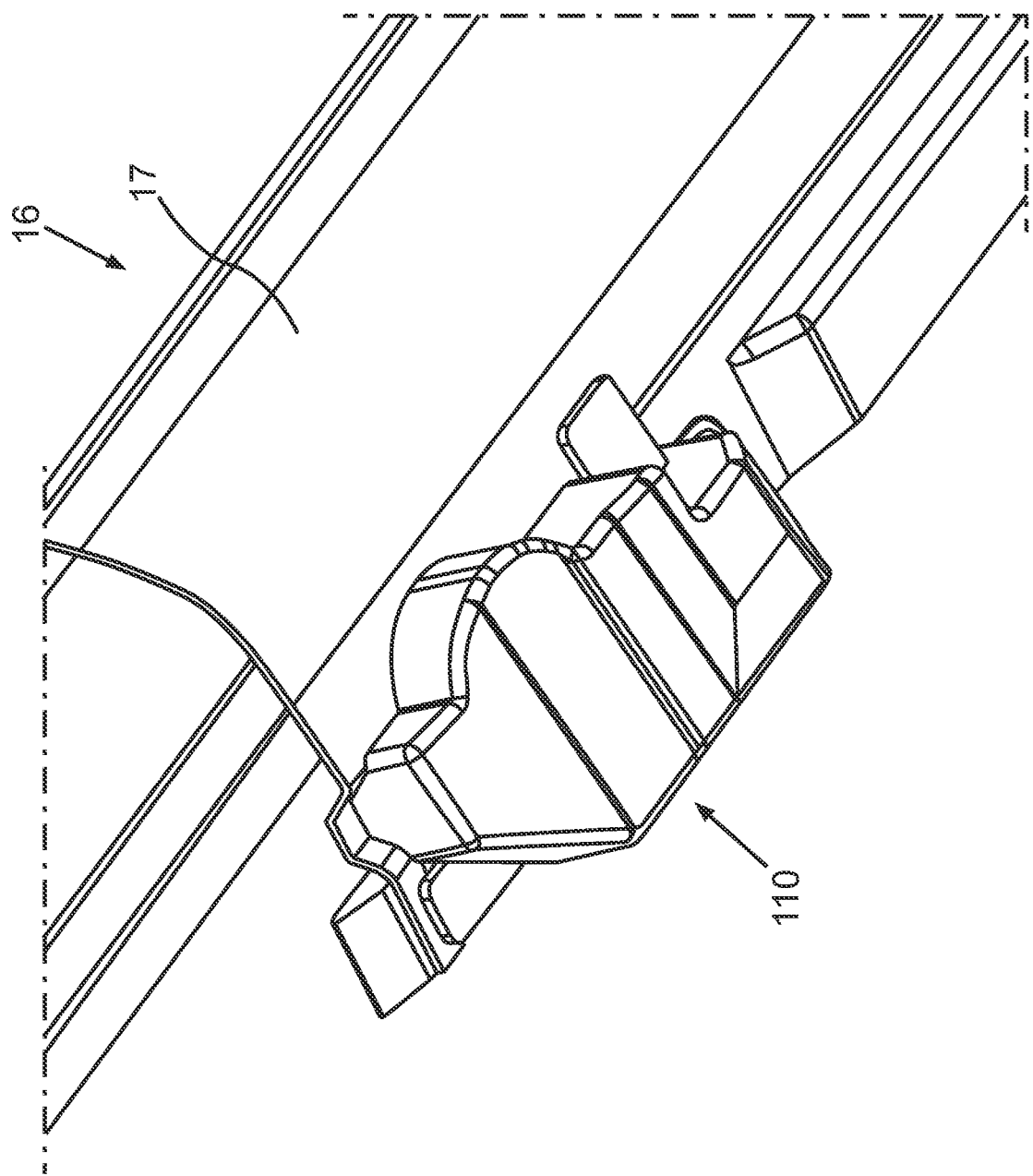

COVER DEVICE FOR A SIDE SILL OF A PASSENGER VEHICLE

BACKGROUND AND SUMMARY OF THE INVENTION

The invention relates to a cover device for a side sill of a passenger vehicle. The invention further relates to the arrangement of such a cover device on a side sill of a passenger vehicle.

In side sills of passenger vehicles, a cover device is customarily provided, which comprises a sill cover which extends inter alia into the region below a door opening and which projects outwards beyond the lower door edge in the transverse direction of the vehicle or is at least flush therewith. Such an extension of the respective sill cover is required in order to protect the side door and in particular the lower door edge thereof from stone chips and dirt from underneath.

However, the described desirable extension of the sill cover outwards in the transverse direction of the vehicle gives rise to the problem in the region of the respective door opening that this considerably impedes continuously increasing requirements in terms of ergonomics and the comfort of vehicles, in particular regarding ease of entry and exit. In particular, upon entry and exit, this leads to the sill cover below the door opening getting in the way of the respective passenger's legs, which can lead to reduced comfort, especially for older people or people with reduced mobility. This problem is also exacerbated for example when the vehicle door cannot be opened widely in narrow parking situations.

Arranging an inherently rigid outer cover element below a corresponding door opening of a vehicle body, which cover element is displaceable between a covering position, which the cover element adopts when the vehicle is in operation, and an entry position, which the cover element should adopt in particular when the vehicle is being entered or exited, is already known from DE 10 2009 031 534 A1. This known cover device thus makes it possible to generally solve the problem of, on the one hand, adequately covering or at least coming flush with a lower edge of a respective side door in the transverse direction of the vehicle in order thereby to ensure appropriate protection against corrosion and dirt and, on the other hand, simplifying entry to and exit from the vehicle by displacing the cover element.

A sill cover is also known from DE 10 2012 018 284 A1, which comprises at least one cover part secured on the sill and at least one cover element made from a flexible material and which is arranged to be mobile in a length region of the side sill below a door. The mobile cover element is displaceable between a covering position and an entry position by means of a drive unit.

DE 10 2017 000 803 A1 describes a generic cover device.

The object of the present invention is to produce a cover device and also an arrangement of such a cover device of the type mentioned at the outset, which have a simple construction which saves on installation space and is easy to install.

In order to produce a cover device which is simple, saves on installation space and is easy to assemble, according to the invention, the motor thereof is arranged on the outside of the cover element secured to the sill and protrudes into the interior of the sill cover with a motor shaft. Accordingly, the invention is based on the concept of producing a drive unit which in itself can be pre-assembled and arranged on the cover element secured to the sill by means of the holding device before the cover device is fastened to the motor vehicle bodyshell, for example, as part of its final assembly. To this end, the drive unit is correspondingly designed such that, when fastening the sill cover on the bodyshell, the drive unit can be simply attached therewith. In this case, the drive unit must be designed such that it is located at least partially in a free space between the sill cover, in particular between the cover element thereof secured on the sill, and a bodyshell-side body element, which is formed, for example, by a body side wall mounted on or attached to the upper or outer side of the side sill or by a part of the side sill itself, for example a side sill outer wall. The side of the bodyshell-side body element which faces the secured cover element can optionally also be provided with a screen, other covers, a film, a coating or the like, such that the wall delimiting the free space or space between the bodyshell-side body element and the secured cover element does not necessarily have to consist of the material of the bodyshell-side body element. In this case, the side sill itself can be of shell construction, i.e., have at least one cavity delimited by shell elements, or be an extruded profile, for example.

The arrangement of the motor on the outside of the secured cover element means that the motor shaft thereof protrudes into the interior of the sill cover, i.e., a cavity delimited by the body element and the secured cover element. This may for example be achieved by the secured cover element having a through-opening, through which the motor shaft protrudes into the interior of the sill cover. It is also possible that the through-opening is not closed on the circumference, such that one or more open recesses are formed in the secured cover element, in the region of which recesses the motor shaft virtually passes the wall of the secured cover element. According to the invention, the motor for displacing the mobile first cover element is designed to be large enough that it does not pass into the space between the sill cover, in particular the secured cover element, and the bodyshell-side body element. However, the motor can be simply arranged below the cover element secured on the sill and for example be protected by a housing or sealed against the cover element secured on the sill, in order to prevent disruption due to the ingress of moisture and dirt.

One advantageous embodiment of the invention provides for an adjustment kinematics system of the drive unit to be provided, which system is arranged inside the secured cover element. Thus, this adjustment kinematics system can preferably be arranged in the space between the sill cover, in particular the secured cover element, and the bodyshell-side body element. As a result, this gives a particularly protected arrangement of the adjustment kinematics system inside the secured cover element, and therefore the adjustment kinematics system is advantageously protected against the ingress of dirt and moisture.

A further advantageous embodiment of the invention provides for the drive unit to comprise a toothed rack for interacting with a toothed wheel on a drive shaft of the mobile first cover element. Such a toothed rack in combination with a toothed wheel on the side of the drive shaft of the mobile cover element makes it possible to achieve a particularly reliable displacement of the mobile cover element between an entry position.

A further advantageous embodiment of the invention provides for the drive unit to comprise a toothed rack for interacting with a toothed wheel on the motor shaft of the motor. This also makes it possible to produce a particularly reliable adjustment kinematics system for displacing the at least one mobile cover element.

In a further advantageous configuration of the invention, the drive unit comprises a coupler mechanism by means of which the toothed rack is coupled on one side for interaction with the toothed wheel on the drive shaft of the mobile first cover element and coupled on the other side with the toothed rack for interaction with a toothed wheel on the motor shaft of the motor. The coupler mechanism therefore enables a simple and space-saving corresponding transmission of the drive motion of the motor to the drive shaft of the mobile cover element.

In this regard, it has further proven advantageous if a mounting device for the coupler mechanism is arranged on the holding device of the drive unit. This results in a particularly simple pre-assemble-able and reliable adjustment kinematics system.

Further advantageous variant embodiments of the cover device are found in the dependent claims and the following description of the figures, optionally in combination with the drawings.

The advantages mentioned above in conjunction with the cover device according to the invention apply analogously to the arrangement. The cover device is furthermore characterised in that the adjustment kinematics system of the drive unit is arranged in the space between a bodyshell-side body element and the sill cover, in particular the cover element secured to the sill thereof. As a result, it is not necessary to undertake in principle any particular measures on the bodyshell-side body element before the cover device according to the invention is fastened thereto.

Hereinafter, an advantageous exemplary embodiment of the cover device according to the invention is described in more detail using the drawings.

BRIEF DESCRIPTION OF THE DRAWINGS

FIG. 8 is a cross-sectional view through the cover device according to FIGS. 3 to 7, wherein the cover elements are shown in the covering position and a flexible cover element is provided, one end of which is arranged on the inherently rigid first cover element through the intermediary of the inherently rigid second cover element, and another end of the flexible cover element is arranged on a body member;

FIG. 9 is a sectional view through the cover device analogous to FIG. 8, wherein the first and second cover elements are arranged in the entry position and hence the flexible cover element is accordingly displaced together therewith;

FIG. 13 is a perspective depiction of a bottom view of a portion of the cover device in the region of a motor of the drive unit covered by means of a covering.

DETAILED DESCRIPTION OF THE DRAWINGS

Figure 1:
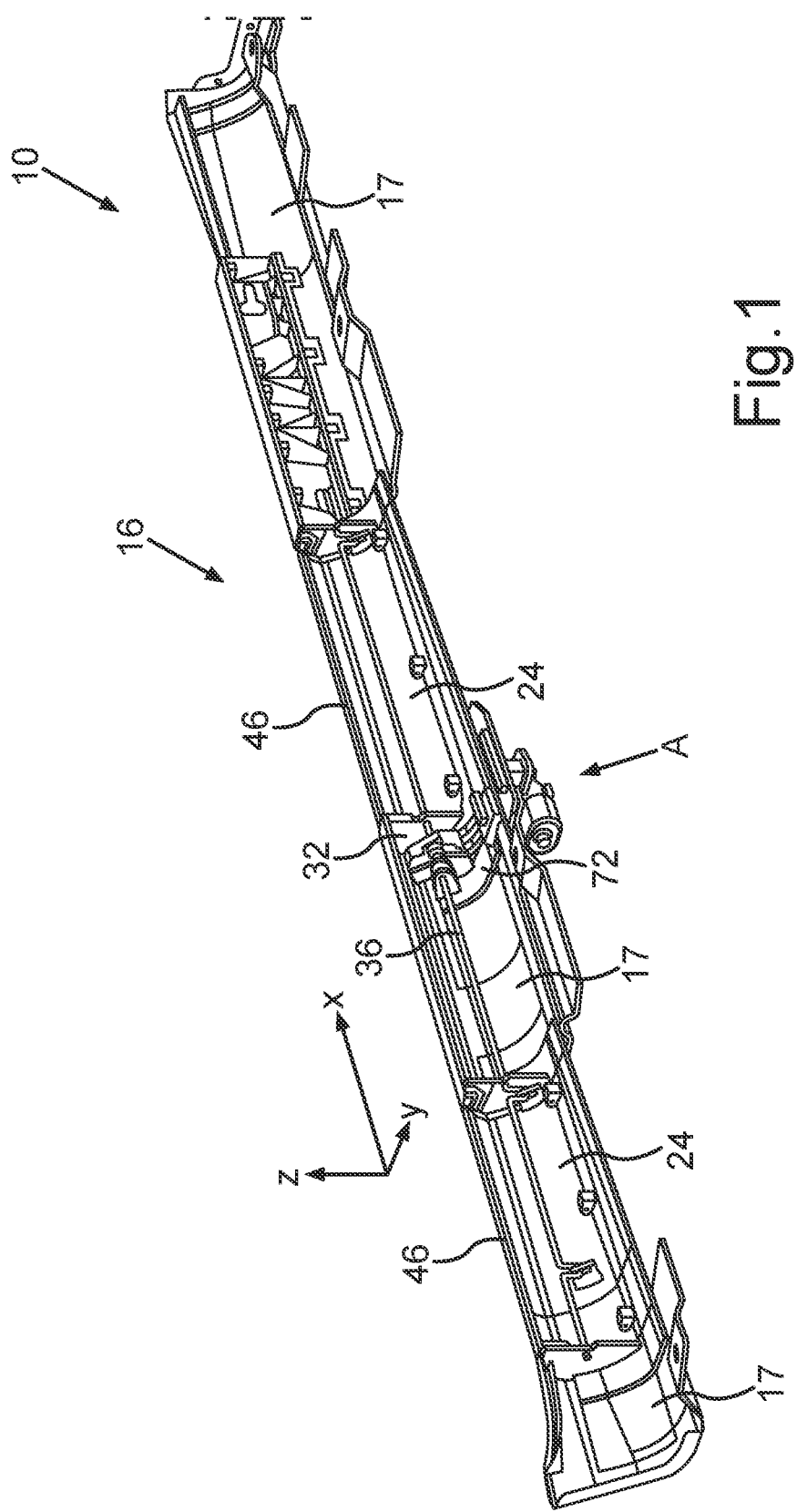
FIG. 1 is a perspective view of a cover device for a side sill of a passenger vehicle having a sill cover having a cover element secured to the sill and respective mobile cover elements arranged below an associated door opening and having a drive unit for adjusting the mobile cover elements, which is designed as a pre-assembled structural unit and is arranged in the region of the cover element secured to the sill by means of a holding device.
Figure 10:
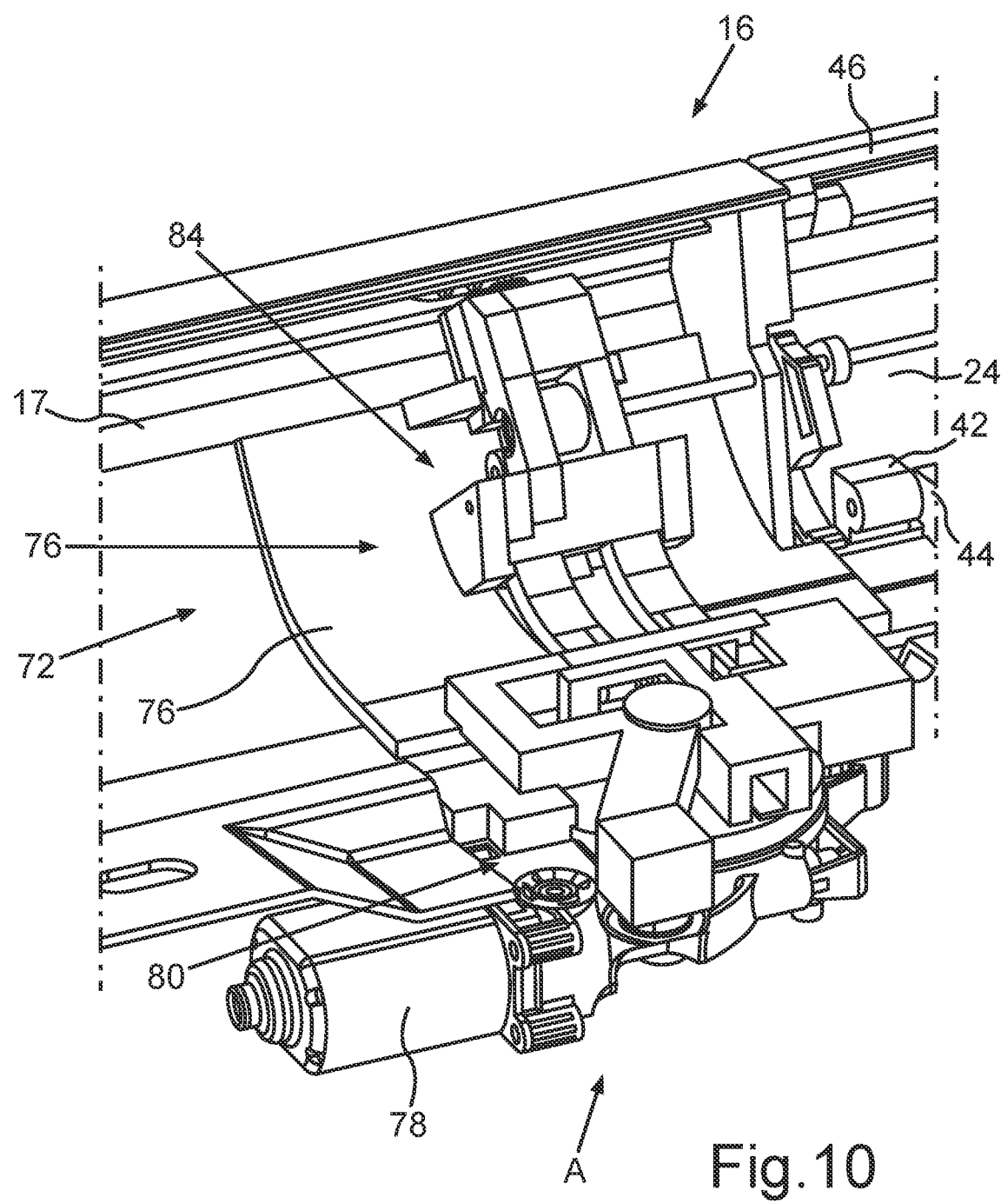
FIG. 10 is a perspective view of the drive unit arranged on the cover element secured to the sill by means of a holding device, which drive unit is designed as a pre-assembled structural unit.
Figure 11:
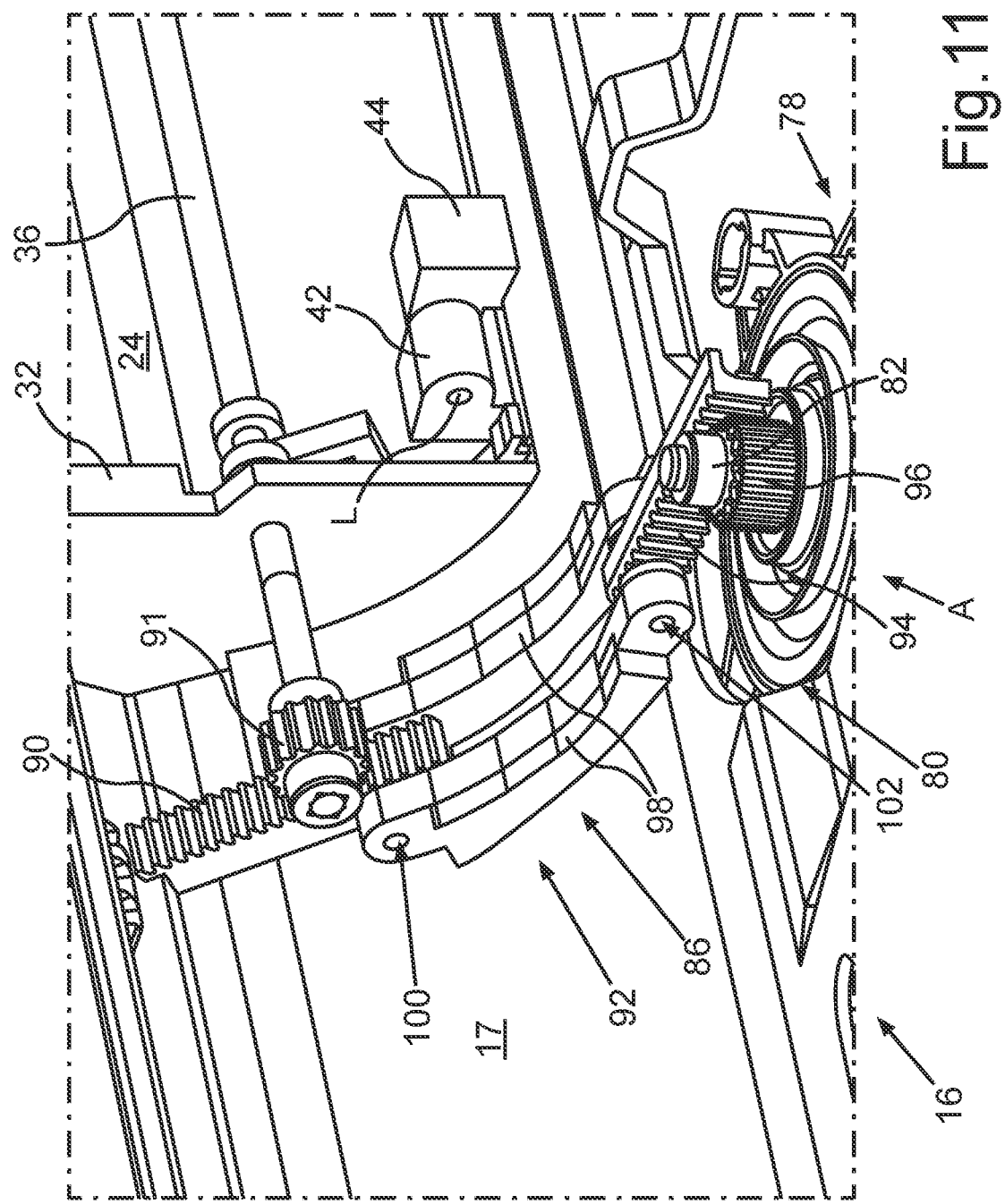
FIG. 11 is a perspective view, enlarged compared to FIG. 10, of the drive unit arranged on the cover element secured to the sill with mounting device for a coupler mechanism or an adjustment kinematics system omitted, by means of which drive unit a drive shaft of the mobile cover element can be driven.
Figure 12:
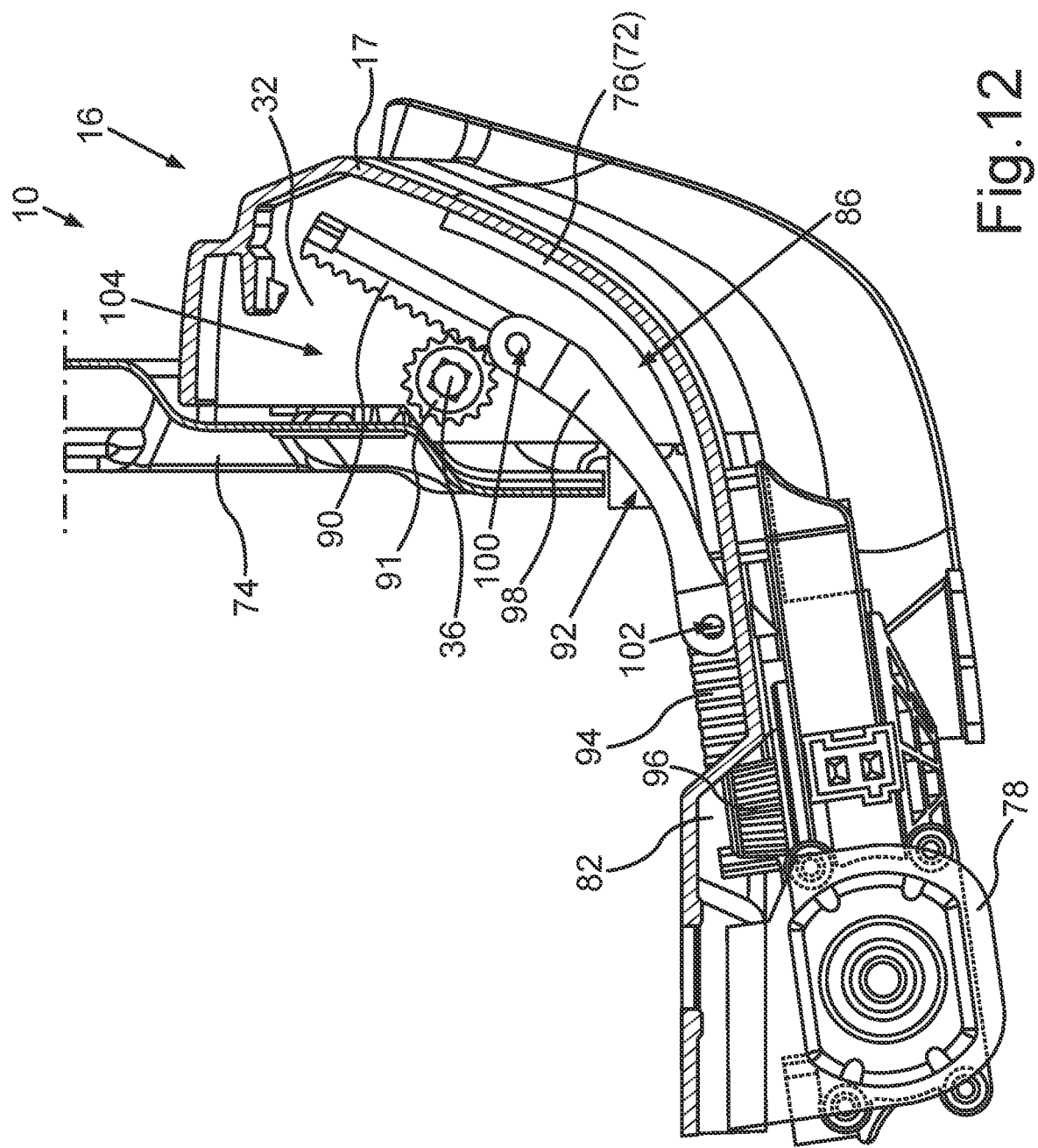
FIG. 12 is a sectional view through the cover device of the side sill and through the bodyshell-side side sill element along a sectional plane running in the vertical direction of the vehicle and in the transverse direction of the vehicle.

FIG. 1 shows a perspective depiction of an exemplary embodiment of a cover device of a side sill 10, also referred to as lateral side member, of a passenger vehicle, which comprises a sill cover 16 with respective cover elements 17 secured to the sill and respective mobile first cover elements 24 arranged below a respective associated door opening 14 (FIG. 2) for a front or rear side door 12 (FIG. 2), which cover elements are adjustable in further ways, described in more detail, by means of a drive unit A (FIGS. 10-12). The drive unit A is here designed as a pre-assembled structural unit and is arranged between the two mobile first cover elements 24 by means of a holding device 72 in the region of the cover element 17 secured to the sill.

It is readily clear that the sill cover 16 depicted in the figures is designed for a vehicle which has at least two entry doors on a vehicle side, wherein each door opening is assigned a mobile first cover element 24. In another exemplary embodiment of the cover device, not shown in the figures, the sill cover 16 has only one such mobile first cover element 24, preferably assigned to the driver or passenger door, and at least one cover element 17 secured to the sill, regardless of whether the vehicle has only one or two doors on each side. The cover element(s) 17 secured to the sill then cover the remaining part of the sill to the left and right, or in front of and/or behind, the mobile first cover element 24.

Figure 2:
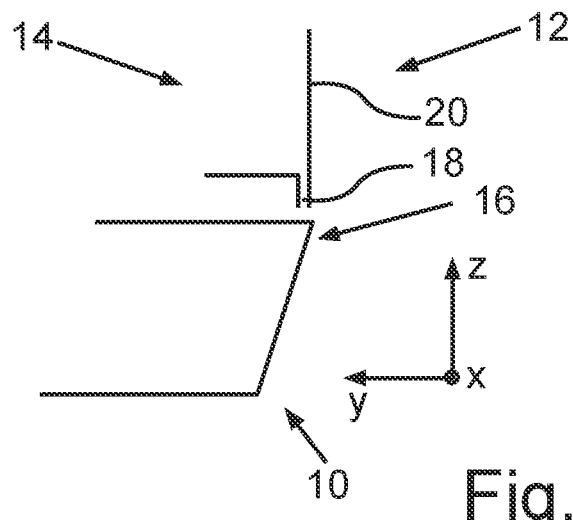
FIG. 2 is a schematic sectional view through the cover device and a side door of a passenger vehicle along a sectional plane running in the transverse direction of the vehicle or in the vertical direction of the vehicle, wherein the sill cover of the side sill is arranged, in the transverse direction of the vehicle, covering or flush with the associated lower door edge of the side door.

FIG. 2 depicts a highly schematic sectional view along a sectional plane running in a vertical direction of the vehicle (z direction) or transverse direction of the vehicle (y direction) of the sill cover 16 for the side sills 10, not shown in more detail, which in the case of a self-supporting passenger car body are each arranged longitudinally below the door entry or door entries between the front and rear wheel arches, and the side door 12 for closing a corresponding door opening 14, which side door is arranged above the side sills and can be seen in sections. It can be seen here that the sill cover 16 extends outwards in the transverse direction of the vehicle (y) to the extent that—in the closed state of the side door 12—it projects beyond an associated lower door edge 18 or an outer cover 20 of the side door 12, or at least ends flush therewith. Such an extension of the outer sill cover 16 has the advantage that—in relation to the vehicle transverse (y-direction)—covering the underside of the lower door edge 18 or the entire side door 12 makes it possible to prevent damage from stone chips or general soiling of the lower door edge 18 or an entire lower region of the side door 12.

The general configuration of the side sill 10 described and, in particular, of the outer sill cover 16 however raises the problem of a more difficult entry to and exit from the vehicle via the door opening 14, in particular for smaller and/or older people or for people with reduced mobility. In this case, the problem is exacerbated when the vehicle door 12 cannot be opened widely enough in narrow parking situations. In particular in such situations, this can lead to uncomfortable entry and exit and to associated fouling of clothing, especially trouser legs.

FIGS. 3 to 7 show respective perspective views, and FIGS. 8 and 9 show respective sectional views, along a sectional plane running in the vertical direction of the vehicle (z direction) or transverse direction of the vehicle (y direction) of the sill cover 16 described in conjunction with FIG. 1 and FIG. 2, which is formed for example from a plastic material and by means of which a bodyshell-side side sill element 74 (FIG. 12) is covered or overlapped outwards or downwards, i.e., in the transverse direction of the vehicle (y direction) and in the vertical direction of the vehicle (z direction).

Figure 3:
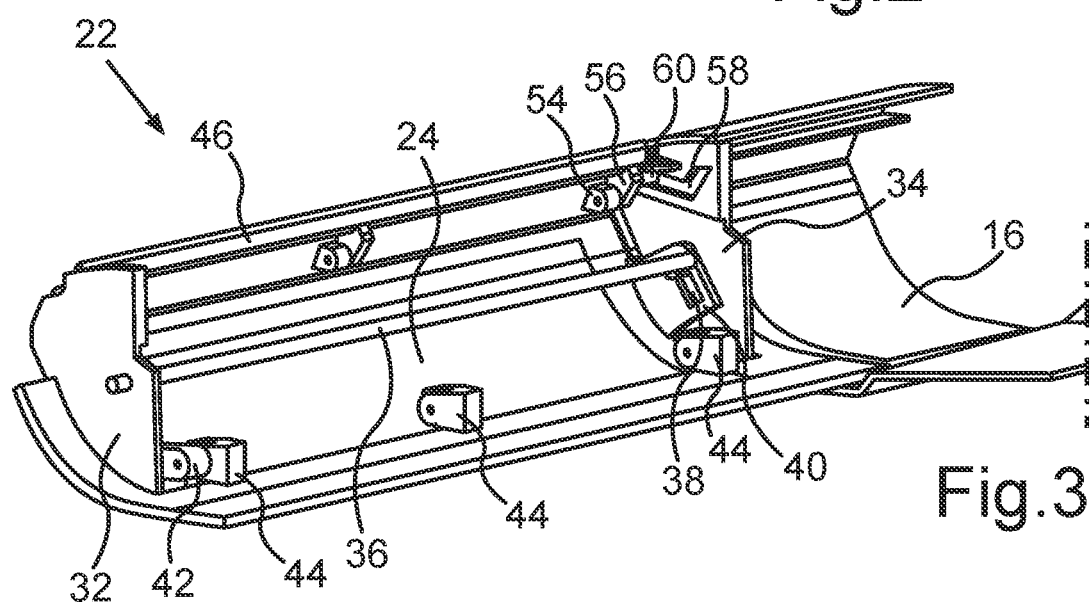
FIG. 3 is a perspective view of the mobile cover elements arranged in a length region of the side sill below a door opening, which in the present case are arranged in a covering position, out of which they are displaceable into an entry position.
Figure 4:
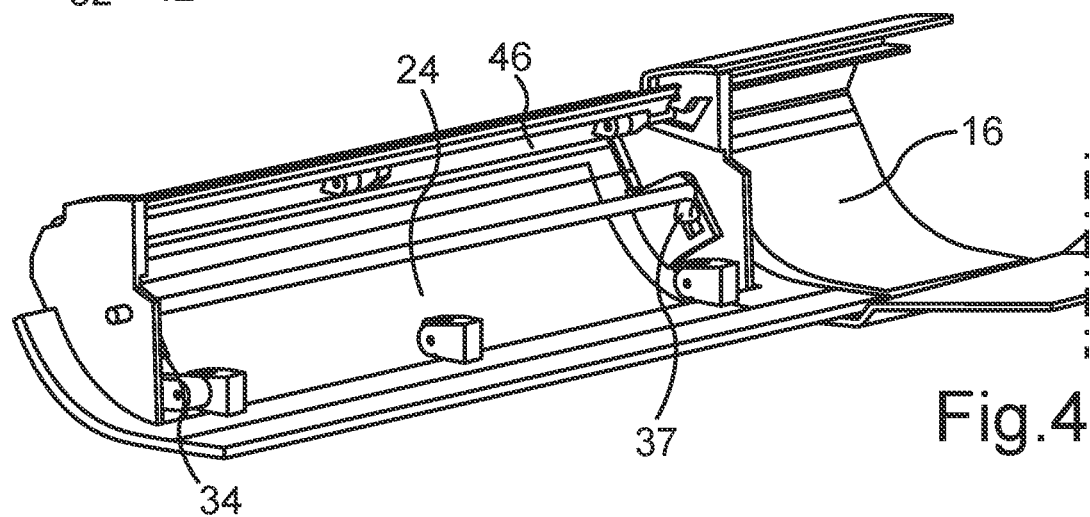
FIG. 4 is a perspective view of the cover device analogous to FIG. 3, wherein the mobile cover elements are shown in an initial position of their displacement movement from the covering position into the entry position.
Figure 5:
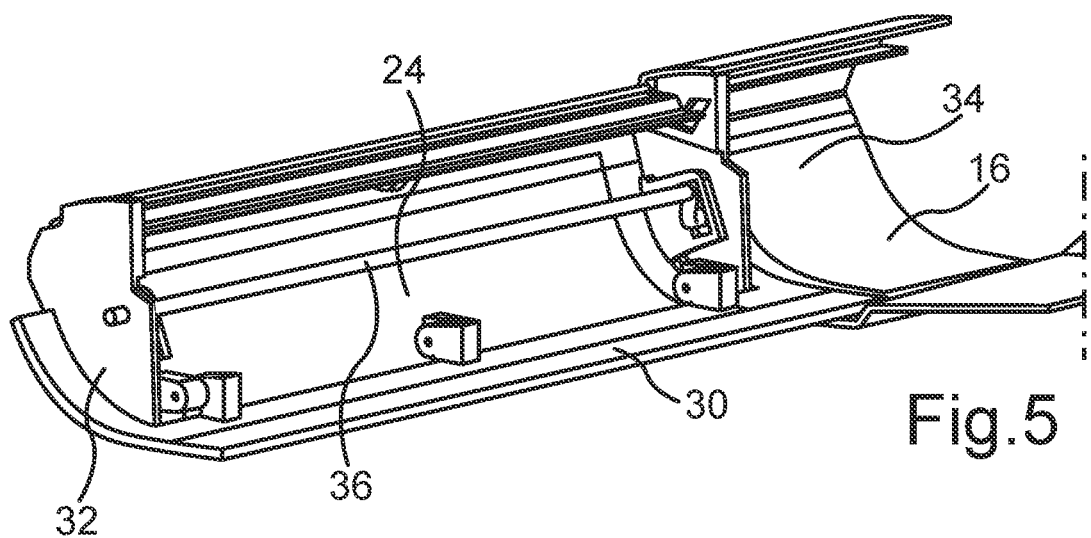
FIG. 5 is a perspective view of the cover device according to FIGS. 3 and 4 in the further course of the displacement movement of the mobile cover element from the covering position into the entry position.
Figure 6:
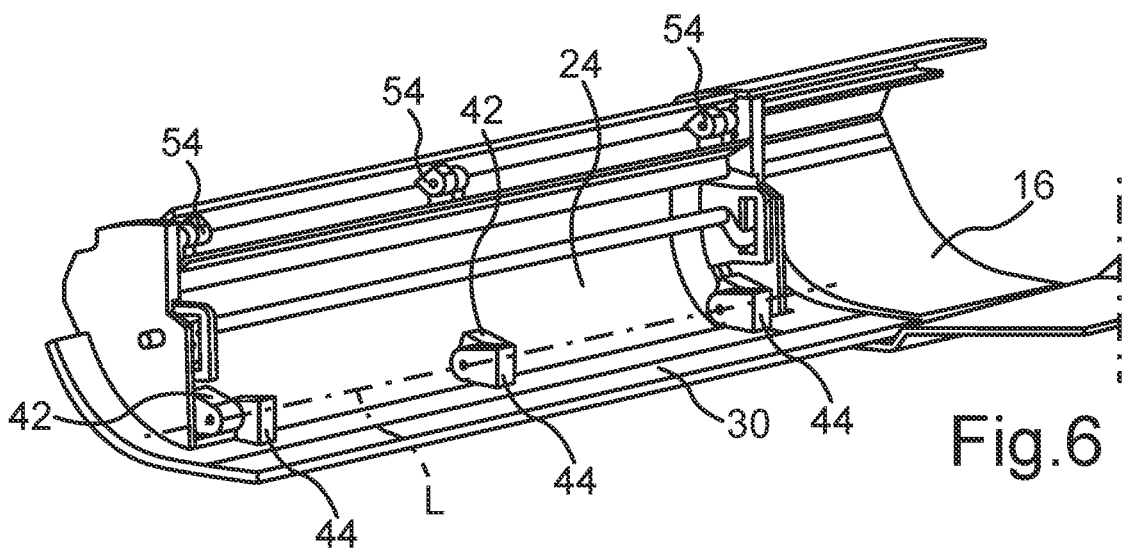
FIG. 6 is a perspective view of the cover device analogous to FIGS. 3 to 5, wherein the cover elements are shown shortly before reaching the entry position.
Figure 7:
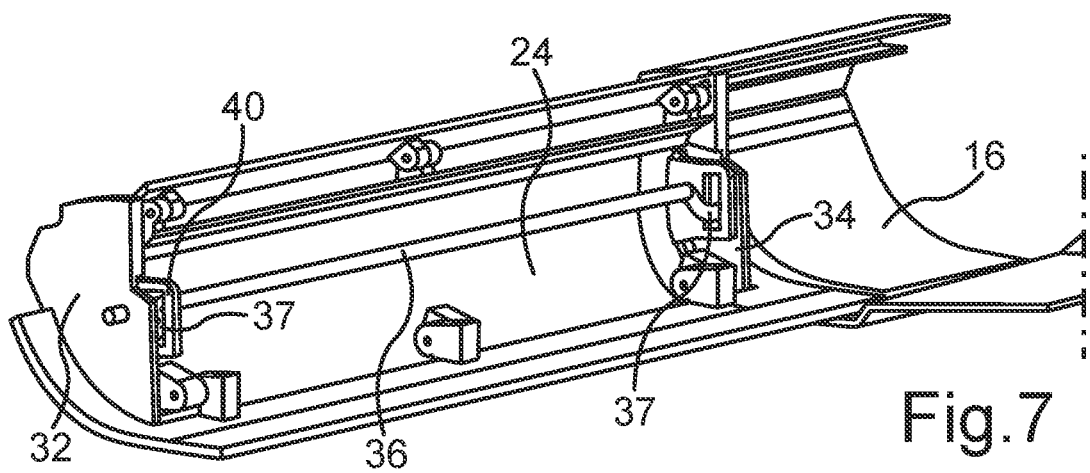
FIG. 7 is a perspective view of the cover device according to FIGS. 3 to 6, wherein the cover elements are shown after reaching the entry position.

Each of the two mobile first cover elements 24 is displaceable in a manner described in more detail below between a covering position visible in FIG. 3 and an entry position visible in FIG. 7. In this case, FIGS. 4 to 6 show intermediate positions of the first cover element 24, which same assumes in its displacement movement between the covering position (FIGS. 1 and 3) and the entry position (FIG. 7). Moreover, FIGS. 8 and 9 show the mobile first cover element 24 in both end positions thereof, namely the covering position in FIG. 8 and the entry position in FIG. 9.

As can be seen in this regard in particular by combined viewing of FIGS. 8 and 9, the inherently rigid, i.e., dimensionally stable mobile first cover element 24 is pivotable about a bearing axis L running in the direction of extension and hence in, or at least substantially in, the longitudinal direction of the vehicle (x direction), which axis is located in a lower part region 26 of the first cover element 24. Accordingly, it can in particular also be seen by combined viewing of FIGS. 8 and 9 that a displacement of the first cover element 24 out of the covering position (FIG. 8) into the entry position (FIG. 9) leads to same being displaced inwards via the at least approximately whole vertical of the side sill 10 or the side cover 16 in the transverse direction of the vehicle (y direction), in order thereby to facilitate the entry and exit of a passenger through the corresponding door opening 14, by reducing the clear width of the sill covering 16 measured in the transverse direction of the vehicle or the space occupied by the first cover element 24 between the outside thereof and the outside of the sill. The "bar" in the region of the door opening 14, which the occupant has to negotiate when entering or exiting, is therefore correspondingly smaller and thus easier to negotiate without brushing over it with their clothing.

Furthermore, it can be seen in particular in FIG. 9 that an upper part region 28 of the mobile first cover element 24 is displaced as far towards the center of the vehicle until it at least approximately comes into abutment with a body element 63, which in the present case is a section of a body side wall, which, in the region of the side sill 10, at least partially covers the latter from above and, where appropriate, on the outside thereof.

As can be seen in particular from FIGS. 3 to 7, the cover device comprises a shell-shaped cover part 30 which has a corresponding curvature viewed in cross-section, into which the mobile first cover element 24 is integrated at least substantially flush in the covering position thereof. This cover part 30 is in this case arranged to overlap with the secured cover element 17 of the sill cover 16, here shown at the front, and also with central cover element 17 shown in FIG. 1. In the state of the cover device installed on the passenger vehicle, the cover part 30 is secured in a static manner to the side sill 10 or to a region close to a sill, such that when the first cover element 24 is pivoted about the bearing axis L between the covering and entry position thereof, the cover part 30 remains positionally fixed, i.e., immobile relative to the side sill 10.

Bearing webs 32, 34, which extend at least substantially in the vertical direction of the vehicle (z direction) and in the transverse direction of the vehicle (y direction), protrude from the cover part 30 at the front and rear of the cover element 24, viewed in the longitudinal extension of the cover element 24, such that an at least substantially U-shaped basic body for the fixed cover part 30 is produced overall, wherein the bearing webs 32, 34 form the side walls of the U-shaped basic body. In the exemplary embodiment of the cover device shown in the figures, the bearing webs 32, 34 extend—viewed in cross section through the sill cover-over the entire height of the sill cover 16, in particular over the entire inside of the static cover element 17, as can readily be seen from FIGS. 8 and 9, and substantially fill most of the cross section of the sill cover 16 in this area, similar to partition panels.

A drive shaft 36 is mounted in a rotationally mobile manner on the bearing webs 32, 34, which drive shaft extends in, or at the very least substantially in, the longitudinal direction of the vehicle (x direction) and approximately horizontally. This drive shaft 36 comprises, in its respective end regions close to the bearing webs 32, 34, a corresponding U-shaped elbow 37, which is in engagement with an associated slit shaped slotted link 38 of a corresponding link element 40, which in turn is secured on the inside of the cover element 24 at the front or rear end thereof. A rotation of the drive shaft 36, by the interaction of the respective elbow 37 with the corresponding slotted link 38 of the corresponding link element 40, accordingly effects the desired displacement movement of the pivotable first cover element 24 about the bearing axis L between the covering position according to FIGS. 3 and 8 and the entry position according to FIGS. 7 and 9.

Furthermore, it can be seen from FIGS. 3 to 7 that in the present case the bearing axis L of the first cover element 24 is defined by respective bearing elements 42, 44, which are secured on the one hand to the inside of the cover element 24 (bearing elements 42) and on the other hand to the inside of the cover part 30 (bearing elements 44). Each of these pairs of bearing elements 42, 44 is in this case connected to one another by a bolt or similar so as to move by pivoting, wherein the bolts of these pairs of bearing elements 42, 44 form the bearing axis L of the cover element 24. As can be seen in particular from FIG. 1, each of the first cover elements 24, mounted so as to move by pivoting on the cover part 30 or on associated cover parts 30, has in total three bearing points each with a pair of bearing elements 42, 44 and also the bolts coupling these to one another, wherein the bolts-viewed in the longitudinal extension direction of the sill cover—are all arranged flush with one another and thus define or form the bearing axis L. The number of bearing points can vary, such that in another exemplary embodiment of the cover device, less than three or more than three bearing points can also be provided for the cover element 24 that moves by pivoting.

As can moreover be seen in particular from FIGS. 8 and 9, a mobile second cover element 46 is displaceably held at the upper end region 27 of the cover element 24, which second cover element, in the covering position according to FIG. 7, extends along an upper end edge 48 of the first cover element 24 and which, in a manner described in more detail below, is also displaced in a positively controlled manner out of the covering position into the entry position—and back again—during the displacement movement of the first cover element 24 in its entry position according to FIG. 8. In the covering position according to FIG. 7, the mobile second cover element 46 is accordingly arranged on top of the first cover element 24. In the exemplary embodiment of the cover device depicted in the figures, the second cover element 46 held so as to pivot on the first cover element 24 is designed as an angular strip element, that is to say that—as can be seen in particular from the cross-sectional depiction according to FIGS. 8 and 9—it is designed to be L shaped and extends horizontally outwards in the transverse direction of the vehicle (y direction) with a leg 50 and at least substantially vertically upwards in the vertical direction of the vehicle (z direction) with a leg 52. In the free space (receiving recess 70) partially framed by the legs 50, 52 and otherwise open to the outside, when the sill cover 16 is arranged in the covering position and the side door 12 is simultaneously closed, the lower edge region thereof protrudes at least partially inwards or is covered downwardly by the leg 50 of the angular strip element. It is clear that the first cover element 24 is considerably larger than the second cover element 46 mounted thereon, wherein the required clear height of the second cover element 46 is largely determined by how far the first cover element 24 should be folded about the bearing axis L in the direction of a passenger compartment; this will be discussed in more detail below.

When the sill cover 16 is in the covering position, as depicted in FIG. 8, the leg 50 of the second cover element 46 directly abuts at an upper longitudinal marginal edge 47 of the first cover element 24, preferably such that no edge is formed between these cover elements on the outside of the sill cover. The shaping of both cover elements 24, 46 is selected accordingly in the facing marginal regions thereof, as illustrated by way of example.

In the entry position according to FIG. 9, the second cover element 46 is arranged substantially below the upper end region 28 of the first cover element 24, wherein the leg 52 extends downwards in the vertical direction of the vehicle (z direction) and the leg 50 extends inwards in the transverse direction of the vehicle (y direction).

The displacement movement of the second cover element 46 between the two end positions thereof—the entry position and the covering position—is thus effected in a positively controlled manner with the displacement movement of the first cover element 24. In this case, the second cover element 46 is displaceable about a bearing axis W via respective bearing elements 54, 56, which are arranged inside the first cover element 24 (bearing element 54) or inside the second cover element 46 (bearing element 56). The bearing element 54 mounted or formed at least indirectly, preferably directly on the first cover element 24 is preferably formed in the manner of a bearing block and serves for the static, pivotable bearing of the other bearing element 56, which is mounted or formed at one end at least indirectly, preferably directly on the second cover element 46, and which in turn serves as a connecting member, which here is designed similarly to a coupler.

Each of the bearing webs 32, 34 additionally comprises a slotted link 58 on the respective inside facing the first cover element 24, which in the present case is approximately L-shaped and in which a bearing journal 60 of the respective associated bearing element 56, which is connected to the second cover element 46, is in engagement. In this exemplary embodiment, the slotted link 58 is formed as a linear guide and has a first longitudinal portion which—viewed in the longitudinal direction of the vehicle (x direction) according to the depiction in FIGS. 8 and 9—runs downwards from the outside at the top towards the inside, in the direction of the passenger compartment of the car. This therefore means that the linear guide formed by the first elongate portion of the slotted link 58 thus slopes obliquely downwards towards the center of the vehicle towards a roadway. A second longitudinal portion of the slotted link 58 adjoins the end of the first longitudinal portion of the slotted link 58, which second longitudinal portion, in this exemplary embodiment, is also designed as a linear guide and forms an angle of greater than 90° in this case with the first longitudinal portion of the slotted link 58. This means that the second longitudinal portion runs obliquely upwards from one end of the first longitudinal portion.

Combined viewing of FIGS. 3 to 7 shows that in this case, the bearing journal 60 runs along the L-shaped slotted link 58 upon the displacement movement of the first cover element 24, and thus effects the displacement or pivoting movement of the second cover element 46 out of the covering position thereof into the entry position thereof.

It should be noted that when the sill cover 16 is adjusted, the first cover element 24 is pivoted about a pivot axis which is static relative to the side sill 10 and thus static on the body, which was generally referred to above as bearing axis L. The individual points of the first cover element 24 thus move along an arcuate path with the central point in the pivot axis/bearing axis L, which in this exemplary embodiment of the cover device intersects the movement path, formed as a linear guide, of the slotted link 38. The pivoting movement of the second cover element 46 mounted on the first cover element 24 so as to move about the pivot axis/bearing axis W, which second cover element in this case—unlike a mesh or woven fabric or the like—is formed as a dimensionally stable, i.e., at least predominantly rigid or stable structure in the form of an angular strip element, is superimposed over this movement. The pivoting movement of the second cover element 46, which forms a termination of the first cover element 24 towards the side door 14, is determined and initiated by the forced guidance of the connecting member 56 in the slotted link 58. According to the illustration and view in FIGS. 8 and 9, pivoting the first cover element 24 clockwise about the L axis causes the second cover element 46 to be displaced translationally to the right and simultaneously to pivot clockwise about the W axis. This means, as can be readily seen from the figures, that the second cover element 46 virtually rotates inwards in relation to the first cover element 24 and moves in relation to the upper longitudinal marginal edge 47 of the first cover element 24 to a lower position in the space between the first cover element 24 and the body element 63. The inward rotation of the second cover element 46 and thus also the adjustment of the first cover element 24 ends when, for example, one of the cover elements 24, 46 runs against a stop and/or by switching off the motor 78, for example initiated by an end switch or the like.

In the exemplary embodiment of the cover device shown in FIG. 9, the end of the pivoting of the cover elements 24, 46 could readily be achieved, for example, by stopping the longitudinal marginal edge 47 of the first cover element 24 against the body element 63 or by stopping the leg 52 of the second cover element 46 against the inner wall of the first cover element 24 or by stopping the leg 50 of the second cover element 46 against the body element 63.

FIG. 8 makes it clear that a flexible cover element 62 is provided, one end 64 of which is arranged at least indirectly—namely in the present case by means of the second cover element 46—on the inherently rigid first cover element 24. In the present case, the other end 66 of the flexible cover element 62 is secured to the body element 63, i.e., the side wall of the motor vehicle. According to FIG. 8, when the sill cover 16 is arranged in the covering position, the flexible cover element 62 thus covers a free space 68 between the inherently rigid first cover element 24 which is in the covering position and the body element 63. The flexible covering element 62, which forms a top cover as described above, is in the present case made of a fabric material, for example a sheet of fabric such as that used for convertible tops. In the covering position, the flexible cover element 62 is arranged in a region of the side sill 10 covered by the associated vehicle door. With the sill cover 16 arranged in the covering position, the cover element 62 is virtually stretched open, i.e., it covers the free space 68 underneath it without wrinkles and thus prevents both the penetration of dirt and the inflow of air during operation of the vehicle, which could lead to disturbing noises.

The second cover element 46 is designed and arranged in its covering position according to FIG. 8 such that it has a receiving recess 70 for the lower door edge 18 of the associated side door 12. This ensures further improves protection of the lower door edge 18 and improved aerodynamics of the vehicle. By displacing the second cover element 46 between its covering position according to FIG. 8 and its entry position according to FIG. 9, it is also possible to displace the first cover element 24 even before the side door 12 is opened. The kinematics of the drive shaft 36 in conjunction with the respective slotted links 38 in the corresponding link elements 40 is designed in such a way that in both end positions—the entry position and the covering position—a dead center is overcome in order to hold the first cover element 24 securely in the corresponding positions. In one of these cases or both cases, a respective stop may be provided in order to additionally secure the position. Alternatively, it is possible to secure the end position protection by means of a self-retaining drive or the like. It is important to avoid unintentional adjustment of the first and second cover elements 24, 46 due to external forces, for example when the vehicle user steps on them when entering and/or exiting, or activation of the drive.

In the present case, the front and rear mobile first cover element 24 and the respectively associated second cover element 46 are driven electromotively by the drive unit A, which is explained below using FIGS. 10 to 12.

FIG. 10 shows, in a sectional and enlarged perspective view, the inside of the cover element 17 arranged in a positionally fixed manner relative to the side sill, which cover element is located between the two mobile first cover elements 24. Here, in particular, the arrangement of the drive unit A can be seen or is made clear, by means of which the drive shaft 36 can be rotated in a manner described in more detail below in order to displace the two cover elements 24 or the associated second cover elements 46. As can be seen in particular in FIG. 10, the drive unit A has a motor 78, preferably designed as an electric motor, which is attached by means of fastening elements to a holding device 72, which comprises a base plate 76, on or in which an adjustment kinematics system 86 (FIG. 11) is guided and mounted. In the exemplary embodiment depicted in the figures, the base plate 76 is fixed in the sill cover 16 by being attached to the inside of the central cover element 17 secured to the sill, for example by adhesive bonding, welding or by means of mechanical retaining elements. To this end, the base plate 76 is adapted to the curved profile of the cover element 17 secured to the sill of the sill cover 16, such that at least a partially planar bearing contact results between base plate 76 and inside of the cover element 17.

FIG. 11 shows a perspective view, slightly enlarged compared to FIG. 10, of the drive unit A, with some mounting elements being omitted compared to the depiction in FIG. 10 in order to show the adjustment kinematics system 86 by means of which the drive shaft 36 can be driven in order to adjust, i.e., to pivot, the mobile first cover elements 24 about the respective bearing axis L.

The adjustment kinematics system 86 of the drive unit A comprises a rectilinear toothed rack 90, which meshes with a toothed wheel 91, which for its part is connected in a rotationally fixed manner to the drive shaft 36 of both the mobile first cover elements 24. The toothed rack 90 is connected to a further toothed rack 94 via a coupler mechanism 92, which further toothed rack in turn meshes with a toothed wheel 96 which is connected in a rotationally fixed manner to a motor shaft of a motor 78 of the drive unit A. In this exemplary embodiment of the cover device, the motor shaft of the motor 78 runs at least substantially in the vertical direction of the vehicle (z direction), as a result of which, in combination with the coupler mechanism 92, a drive unit A can be produced which makes overall space savings, in particular which is of compact construction in the vertical direction of the vehicle, as can be readily seen from the figures. The coupler mechanism 92 comprises two arc-shaped coupling bars 98, which are pivotably connected in the region of respective coupling axes 100, 102 with the respective linear toothed racks 90 and 94. Via the two coupling rods 98, a linear displacement movement of the toothed rack 94 in the transverse direction of the vehicle outwards or inwards can thus be transferred to a of the toothed rack 90 which runs obliquely thereto, in order to move the toothed rack along its direction of extension and thereby mesh with the toothed wheel 91 of the drive shaft 36 or thereby rotate the drive shaft 36 about its longitudinal central axis.

The coupler mechanism 92 with the two toothed racks 90 and 94 is mounted and guided on the base plate 76 via a mounting device 84 which can be seen in FIG. 10 but which is not described in more detail.

As can be seen in combination with FIG. 12, which shows a sectional view through the cover device of the side sill 10 and through a bodyshell-side body element 74, which can be part of the side sill 10 and in this exemplary embodiment is a side wall portion of the body outer wall which at least partially covers the side sill 10 towards the outside, along a sectional plane running in the vertical direction of the vehicle (z-direction) and in the transverse direction of the vehicle (y-direction), the complete coupler mechanism 92 with the toothed racks 90 and 94 and the mounting device 84 is arranged in a space 104 between the bodyshell-side body element 74 and the cover element 17 secured on the sill, of the sill cover 16. Thus, the adjustment kinematics system 86 is arranged in an exceptionally space-saving manner and—in particular as a result of the configuration of the coupler mechanism 92—arranged with a substantially arc-shaped basic cross-sectional contour within the space 104.

Since the motor 78 of the drive unit A is not located within the space 104, it is arranged outside or under the cover element 17 secured on the sill. Here, the motor 78 is connected to the base plate 76, which in turn is held inside the cover element 17 secured on the sill. The motor shaft 82 of the motor 78 passes through a passage 80 (FIG. 11), open at the edge, of the cover element 17 secured on the sill.

Looking at FIGS. 10 to 12 together with FIG. 1, it can thus be seen that, by means of the drive unit A, the two mobile first cover elements 24 or the associated angular strip elements (second cover elements) 46 can be easily displaced between their respective covering position and their respective entry position by rotating the drive shaft 36. It should be taken into account here that the present drive unit A is not only suitable for the variants shown here of the respective mobile first cover elements 24 but also for other variants. It is essential for the present invention that a drive unit A is produced in which only the adjustment kinematics system for both first cover elements 24 can be arranged in a space-saving manner in the relatively small space 104 between the bodyshell-side body element 74 and the sill cover 16, in particular the cover element 17 secured on the sill, while the motor 78 used for adjusting the sill cover 16 is arranged outside the cavity/space 104, 104 delimited by the sill or the side wall attached thereto and the cover parts of the cover device, namely below the cover device.

Despite the relatively small, i.e., in particular narrow, installation space between side sill 10 and its associated sill cover 16, an efficient drive concept is produced here. It is advantageous that the base plate 76 with motor 78 together with adjustment kinematics system 86 is fixed on or in the cover device, also referred to as side member cover, and therefore the whole cover device can be assembled as one unit, in particular a pre-assemble-able structural unit, including drive, on the motor vehicle. This is advantageous not only for the assembly time, but also for tolerance.

Since the drive unit A is not, or not completely, accommodated in the base body of the sill cover 16 and the space 104 can therefore be made particularly narrow, the arrangement of the motor 78 below the sill cover 16 results in an arrangement of the motor in the underbody region of the motor vehicle when the cover device according to the invention is installed on the motor vehicle, as can be seen in FIG. 12.

FIG. 13 shows a perspective depiction of a section of the side member cover device described using FIGS. 1 to 12 from obliquely below on the side facing the roadway in the state mounted on the motor vehicle. The cover element 17 of the sill cover 16 can particularly be seen, on the underside of which the motor 78 (FIG. 12) is arranged, which cannot be seen in this depiction. The motor 78 and optionally also other parts arranged below the cover device thereof are protected from below against external mechanical actions and also against dirt by means of a covering 110. It can be seen that the downward projection of the drive unit A, in particular of the motor 78 from the cover element 17, is only slight, i.e., the motor 78 has a low overall height, and therefore the ground clearance of the motor vehicle is only slightly affected, if at all.

In this embodiment, the covering 110 is fixed on the side member cover, in this case more specifically on the cover element 17 secured on the sill, but—if desired—it can be attached on the bodyshell, for example the side sill, after or during the assembly of the cover device on the motor vehicle. In another exemplary embodiment, not illustrated in the figures, the motor covering 110 is integrated in an underbody cover, i.e., it can be attached to an underbody cover part or formed thereon. This means that, before the underbody cover is attached, the cover device according to the invention is first assembled and the covering 110 of the motor 78 is only attached by attaching the underbody cover to the motor vehicle.

The invention claimed is:

1. A cover device for a side sill (10) of a passenger vehicle, comprising:
    a sill cover (16) which includes a cover element (17) securable on the side sill (10) and a mobile cover element (24) which is disposable in a length region (22) of the side sill (10) below a door opening (14) of the passenger vehicle; and
    a drive unit (A), wherein the mobile cover element (24) is displaceable between a covering position and an entry position by the drive unit and wherein the drive unit, configured as a pre-assembled structural unit, has a motor (78) and is disposed in a region of the cover element (17) by a holding device (72);
    wherein the motor (78) is disposed on an outside of the cover element (17) and protrudes into an interior of the sill cover (16) with a motor shaft (82).

2. The cover device according to claim 1, wherein the drive unit (A) has an adjustment kinematics system (86) which is disposed inside the cover element (17).

3. The cover device according to claim 1, wherein the drive unit (A) has a toothed rack (90) which interacts with a toothed wheel (91) on a drive shaft (36) of the mobile cover element (24).

4. The cover device according to claim 1, wherein the drive unit (A) has a toothed rack (94) which interacts with a toothed wheel (96) on the motor shaft (82) of the motor (78).

5. The cover device according to claim 3, wherein the drive unit (A) has a toothed rack (94) which interacts with a toothed wheel (96) on the motor shaft (82) of the motor (78) and wherein the drive unit (A) has a coupler mechanism (92) which couples the toothed rack (90) to the toothed rack (94).

6. The cover device according to claim 5, wherein a mounting device (84) for the coupler mechanism (92) is disposed on the holding device (72).

7. An arrangement of a cover device on a side sill (10) of a passenger vehicle, comprising:
    the cover device according to claim 1;
    wherein the sill cover (16) of the cover device is disposed on a bodyshell-side body element (74) of the passenger vehicle and forms a space (104) and wherein the cover part (17) is secured on the side sill (10) and the mobile cover element (24) is disposed in a length region (22) of the side sill (10) below a door opening (14) of the passenger vehicle.

8. The arrangement according to claim 7, wherein an adjustment kinematics system (86) of the drive unit (A) is disposed in the space (104) between the bodyshell-side body element (74) and the sill cover (16).

9. The arrangement according to claim 7, wherein the motor (78) is disposed in a region below the space (104).

\* \* \* \* \*